(No Model.) 2 Sheets—Sheet 1.
M. O. REHFUSS.
CLUTCH AND STOP MOTION FOR SHAFTING.
No. 362,997. Patented May 17, 1887.
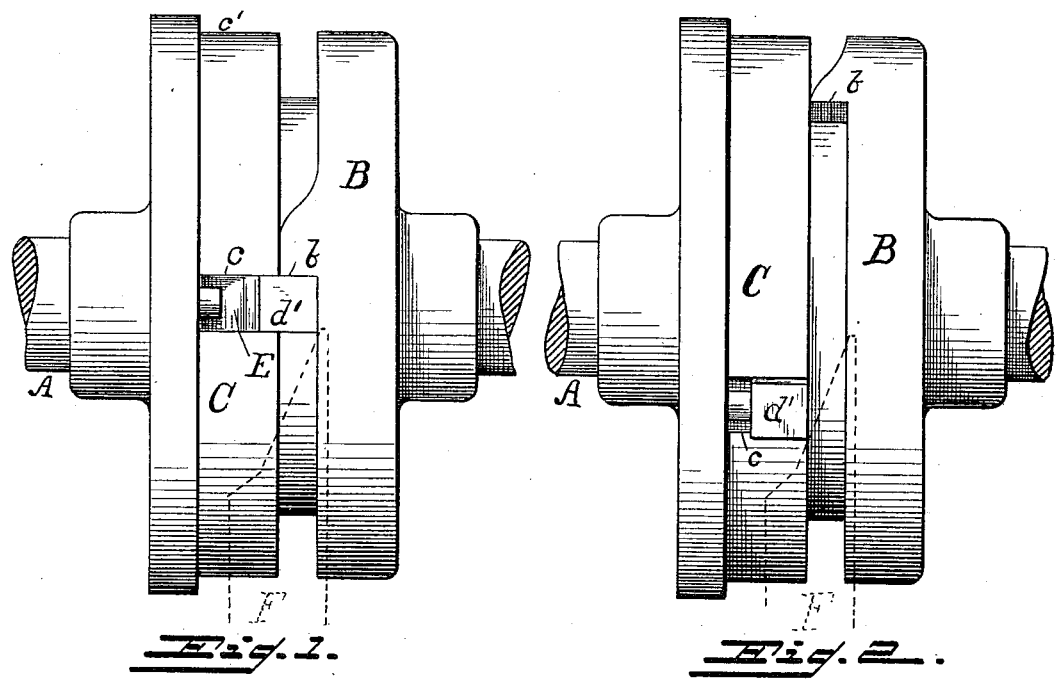
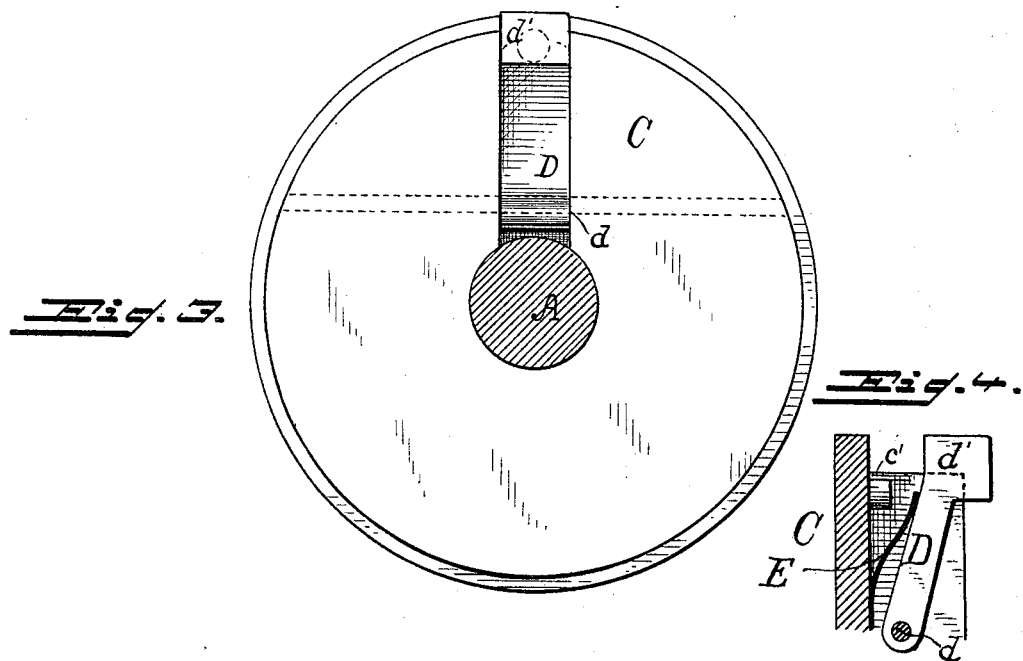
WITNESSES
Will J. Powell.
John W. Ans
INVENTOR
Martin O. Rehfuss,
By Connolly Bros.,
Attorneys (No Model.) 2 Sheets—Sheet 2.

M. O. REHFUSS.
CLUTCH AND STOP MOTION FOR SHAFTING.

No. 362,997. Patented May 17, 1887.

WITNESSES
will be Powell.

INVENTOR
Martin O. Rehfuss,
By Connolly Bro.,
Attorneys.

UNITED STATES PATENT OFFICE.

MARTIN O. REHFUSS, OF PHILADELPHIA, PENNSYLVANIA.

CLUTCH AND STOP-MOTION FOR SHAFTING.

SPECIFICATION forming part of Letters Patent No. 362,997, dated May 17, 1887.

Application filed May 7, 1886. Serial No. 201,442. (No model.)

*To all whom it may concern:*

Be it known that I, MARTIN O. REHFUSS, a citizen of the United States, residing at Philadelphia, in the county of Philadelphia and State of Pennsylvania, have invented certain new and useful Improvements in Clutches and Stop-Motions for Shafting, &c.; and I do hereby declare the following to be a full, clear, and exact description of the invention, reference being had to the accompanying drawings, which form part of this specification, in which—

Figure 5:
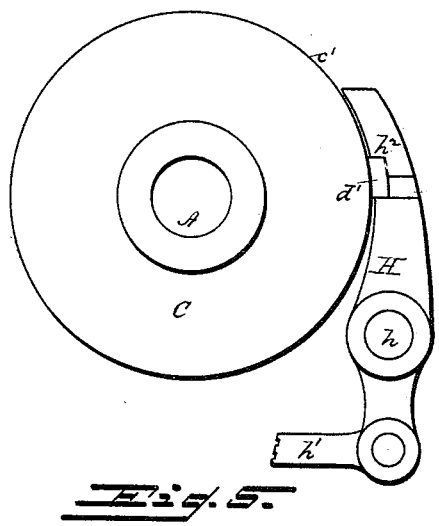
Figure 6:
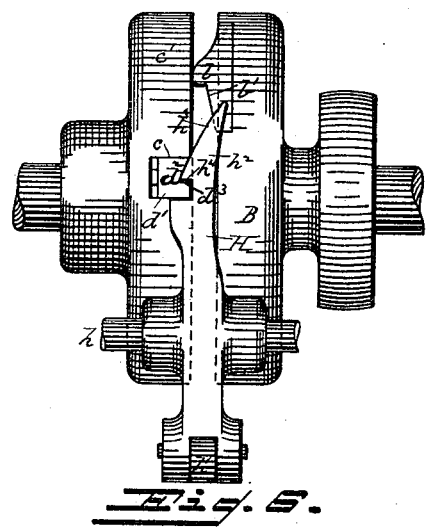
Figure 7:
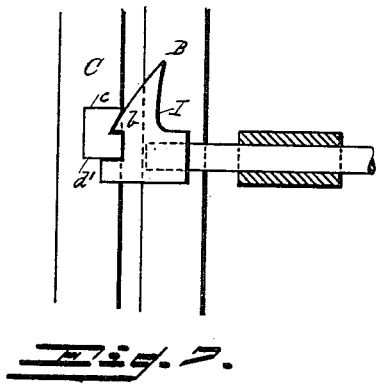
Figure 8:
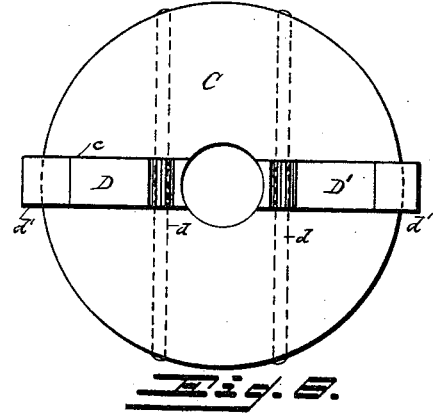

Figure 1 is a side elevation of clutch, the members being in engagement, and Fig. 2 is a side elevation of clutch, the members being disengaged, and a diagram of a shifter being shown in dotted lines in both figures. Fig. 3 is an end elevation of one of the members and the shifter with shaft in section. Fig. 4 is a vertical detail section of fast pulley or member, showing the attached spring-arm by which engagement with the loose pulley or member is effected. Fig. 5 is an end elevation of clutch, including shifter, and Fig. 6 is a side or front elevation of same. Fig. 7 is a detail elevation, partly in section. Fig. 8 is an inner end elevation of modified form of fast clutch member having two arms to secure a stoppage or starting on half-revolution of shaft.

My improvements have for their object to provide a clutch and stop-motion device of simple and efficient construction.

My invention consists in the peculiar construction and combinations of parts, hereinafter fully described and specifically claimed.

Referring to the accompanying drawings, A designates a shaft, on which is mounted a loose member or disk, B. Said member or disk is formed with a shoulder or projection, $b$, on its inner face or side.

C is a member or disk fast on the shaft A. Neither of the members or disks B or C is intended to move lengthwise on the shaft; but both keep the same distance apart from each other, whether clutched or disengaged.

D is an arm, pivoted at $d$ in a recess, $c$, in the clutch member or disk C, its outer end terminating in a block or head, $d'$. Back of the arm D, and in the recess $c$, is a spring, E, which tends to constantly press the upper end of the arm D or its head $d'$ toward the disk or member B, and which, when unrestrained, holds said head $d'$ as far projected as shown in Figs. 1 and 4—that is, in the path of rotation of the shoulder $b$.

The arm D may be pushed back or vibrated into the recess $c$ until the block or head $d'$ occupies the position shown in Fig. 2, where it is clear of the shoulder $b$.

Any suitable shifter may be employed for the purpose of retiring the arm D into the recess $c$. For example, a wedge-shaped or beveled-sided arm, F, (shown in dotted lines in Figs. 1 and 2,) may be used. I prefer, however, to use a lever, H, as shown in Figs. 5 and 6, which is fulcrumed on a shaft, $h$, and has at one end a link, $h'$, or other means of connection with a cam or other mechanism, whereby it can be rocked on its fulcrum, so as to bring its other end, $h^2$, into the path of rotation of the head $d'$ of the arm D and out of said path. Said shifter is beveled, as shown at $h^3$, so that when the head $d'$ meets it said head rides or moves on an incline. When said shifter is moved out of contact with the head $d'$, the arm D is moved by the spring toward the member B, and as soon as the shoulder $b$ on the latter meets said arm the clutching of the members is effected and the shaft A started.

The friction produced by the sliding of the head $d'$ on the beveled side of the shifter causes the shaft A to be stopped gradually and without sudden shock.

It will be noted that the head $d'$ projects radially beyond the outer edge of the face $c'$ of the disk or member C, the arm D being of greater radius than disk or member B. Hence the shifter can be moved into the path of rotation of the outer extremity of said head $d'$ without having said shifter contact with the shoulder $b$, and the head $d'$, riding or sliding on the beveled side of said shifter, will be retired into the recess $c$, thus providing a disengagement or unclutching of the clutch members.

To prevent rebound of the member C after an unclutching movement by the shifter, the arm D is formed with a beveled notch, $d^2$, and shoulder $d^3$, which engage with a shoulder, $h^4$, on the shifter, thereby securely holding said member C, and to prevent sudden shock in clutching, or when, after being released by the shifter, the head $d'$ contacts with the shoulder $b$ on member B, said member is formed or provided with an incline, $b'$, on or against which the said head $d'$ rides or presses before coming in contact with said shoulder. The pressure of said head against said incline produces friction, which effects the gradual starting of member C and of the shaft A. With but a single arm, D, the clutching action would be effected only once in a revolution of shaft A; but if it be desired to clutch in less than a revolution two spring-arms, D D', as shown in the modification in Fig. 8, or more than two, may be employed.

Instead of having a rocking or lever shifter, as shown in Figs. 5 and 6, a sliding shifter, I, may be provided, as shown in Fig. 7.

This clutch is applicable to various kinds of machinery, and I mention a mortising-machine as one in which it may be advantageously used.

What I claim as my invention is—

1. The combination, with disk or member B, having shoulder $b$ and incline $b'$, of member C, having radial spring-arm D, said incline serving to produce friction and prevent sudden jar in engaging the clutch members, substantially as shown and described.

2. The combination, with clutch member or disk C, having spring-arm D, provided with beveled notch, having a shoulder, $d^3$, of shifter H, having shoulder $h^4$, whereby rebound of said member C is prevented after engagement with said shifter, substantially as shown and described.

3. A clutch and stop-motion for shafting, comprising, in combination with a shaft, two members immovable laterally on said shaft, and having a clear or open space between them, one of said members having a radial spring-arm which projects beyond the periphery of the member to which it is fastened and is movable toward and from the other member, the latter having a shoulder, with which said spring-arm engages, and a shifter which impinges against the projecting end or head of said spring-arm and locks or holds the member carrying the latter after disengagement from the other member, substantially as shown and described.

4. In a clutch for shafting, the combination of two members—one fast and the other loose on their shaft—one of said members having a laterally-projecting shoulder or stop, the other member having two spring-arms to engage with said shoulder, and a shifter for moving said spring-arms, whereby their shaft can be started and stopped twice at each revolution, substantially as shown and described.

In testimony that I claim the foregoing I have hereunto set my hand this 19th day of April, 1886.

MARTIN O. REHFUSS.

Witnesses:
WILL H. POWELL,
R. DALE SPARHAWK.